United States Patent
Choi et al.

(10) Patent No.: US 12,417,320 B2
(45) Date of Patent: *Sep. 16, 2025

(54) METHOD AND SYSTEM FOR RUNTIME INTEGRITY CHECK

(71) Applicant: REBELLIONS INC., Seongnam-si (KR)

(72) Inventors: Myunghoon Choi, Seongnam-si (KR); Chang-Hyo Yu, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 182 days.

This patent is subject to a terminal disclaimer.

(21) Appl. No.: 18/521,890

(22) Filed: Nov. 28, 2023

(65) Prior Publication Data
US 2024/0256714 A1 Aug. 1, 2024

Related U.S. Application Data

(63) Continuation of application No. 18/338,258, filed on Jun. 20, 2023, now Pat. No. 11,874,953.

(30) Foreign Application Priority Data

Feb. 1, 2023 (KR) .......... 10-2023-0013954

(51) Int. Cl.
*G06F 21/64* (2013.01)
*G06F 21/60* (2013.01)
(Continued)

(52) U.S. Cl.
CPC ............ *G06F 21/64* (2013.01); *G06F 21/602* (2013.01); *G06F 21/74* (2013.01); *G06F 21/78* (2013.01)

(58) Field of Classification Search
CPC ........ G06F 21/55; G06F 21/554; G06F 21/57; G06F 21/577; G06F 21/60; G06F 21/602;
(Continued)

(56) References Cited

U.S. PATENT DOCUMENTS 9,317,708 B2 * 4/2016 Lee .................. H04L 9/0844
2020/0201779 A1 * 6/2020 Skertic .............. H04L 63/0823
(Continued)

FOREIGN PATENT DOCUMENTS

| KR | 10-2021-0104278 A | 8/2021 |
| KR | 10-2021-0130240 A | 10/2021 |
| KR | 10-2022-0045758 A | 4/2022 |

OTHER PUBLICATIONS

Office Action for KR 10-2023-0013954 by Korean Intellectual Property Office dated Dec. 18, 2024.

*Primary Examiner* — Kevin Bechtel
(74) *Attorney, Agent, or Firm* — BROADVIEW IP LAW, PC

(57) ABSTRACT

A method for runtime integrity check, performed by a security core including one or more processors includes storing a first output value, which is generated by using a one-way encryption algorithm based on first data and a first encryption key managed by an encryption key manager accessible by the security core, in a main memory that is a volatile memory in association with the first data, generating a second output value for the first data based on the first data and the first encryption key by using the one-way encryption algorithm, and checking for possible tampering of the first data stored in the main memory by comparing the first output value with the generated second output value.

18 Claims, 14 Drawing Sheets

(51) Int. Cl.
*G06F 21/74* (2013.01)
*G06F 21/78* (2013.01)

(58) Field of Classification Search
CPC ..... G06F 21/62–629; G06F 21/64–645; G06F 21/78–79; H04L 9/3236–3242; H04L 9/3247–3257
See application file for complete search history.

(56) References Cited

U.S. PATENT DOCUMENTS

| | | |
|---|---|---|
| 2020/0313861 A1 | 10/2020 | Troia et al. |
| 2021/0255802 A1 | 8/2021 | Jang |
| 2021/0312055 A1* | 10/2021 | Kloth .................... H04L 9/0866 |
| 2022/0107737 A1 | 4/2022 | Choi et al. |

* cited by examiner

METHOD AND SYSTEM FOR RUNTIME INTEGRITY CHECK

CROSS-REFERENCE TO RELATED APPLICATION

This application is a continuation of U.S. application Ser. No. 18/338,258, filed on Jun. 20, 2023, which claims priority to Korean Patent Application No. 10-2023-0013954, filed in the Korean Intellectual Property Office on Feb. 1, 2023, the entire contents of which are hereby incorporated by reference.

TECHNICAL FIELD

The present disclosure relates to a method and system for runtime integrity check, and more particularly, to a method and system for integrity check on data in use that is stored in a main memory.

BACKGROUND

Integrity check refers to a procedure of verifying whether data has been tampered with by a malicious attack. According to the related art, the integrity check is mainly performed on the data stored in a non-volatile memory. This is because data to be reused is mainly stored in the non-volatile memory due to the characteristics of the non-volatile memory maintaining stored data even when there is no power supply. On the other hand, since the main memory, which is a volatile memory, has a characteristic in which stored data is volatile when there is no power supply, it is generally not subject to integrity check.

Meanwhile, data that is not frequently updated and is mainly reused, for example, data having a read-only characteristic may also be stored in the main memory, for example, in the volatile memory. When data having the read-only characteristic stored in the main memory has been tampered with by a malicious attack, there is a problem that an output value of an operation based on that data may be erroneously derived or the system may be exposed to danger.

SUMMARY

In order to solve the problems described above, the present disclosure provides a method for, a non-transitory computer-readable recording medium storing instructions for, and an apparatus (system) for runtime integrity check.

The present disclosure may be implemented in a variety of ways, including a method, an apparatus (system), or a non-transitory computer-readable recording medium storing instructions.

According to some embodiments of the present disclosure, a method for runtime integrity check is provided, which may be performed by a security core including one or more processors and include storing a first output value, which is generated by using a one-way encryption algorithm based on first data and a first encryption key managed by an encryption key manager accessible by the security core, in a main memory that is a volatile memory in association with the first data, generating, by using the one-way encryption algorithm, a second output value for the first data based on the first data and the first encryption key, and checking for possible tampering of the first data stored in the main memory by comparing the first output value with the generated second output value.

According to some embodiments, the first data may be data associated with at least one of firmware, a page table, or a parameter of a trained machine learning model.

According to some embodiments, the method may further include generating, by using the one-way encryption algorithm, a third output value based on the first data and a second encryption key managed by the encryption key manager, and storing the third output value in the main memory in association with the first data.

According to some embodiments, the method may further include, prior to storing the first output value in the main memory which is the volatile memory in association with the first data, generating, by using the one-way encryption algorithm, a fourth output value based on the first data stored in the non-volatile memory accessible by the security core and the first encryption key, and checking for possible tampering of the first data stored in the non-volatile memory by comparing the first output value stored in the non-volatile memory in association with the first data with the generated fourth output value. Storing of the first output value in the main memory, which is the volatile memory in association with the first data, may include, if it is determined that the first data stored in the non-volatile memory has not been tampered with, storing the first data and the first output value in the main memory in association with each other.

According to some embodiments, the method may further include, prior to storing the first output value in the main memory, which is the volatile memory in association with the first data, generating, by using the one-way encryption algorithm, a fifth output value based on the first data stored in the non-volatile memory accessible by the security core and a third encryption key managed by the encryption key manager, checking for possible tampering of the first data stored in the non-volatile memory by comparing a sixth output value stored in the non-volatile memory in association with the first data with the generated fifth output value, and if it is determined that the first data stored in the non-volatile memory has not been tampered with, determining the first encryption key to be a new encryption key for the first data and generating, by using the one-way encryption algorithm, the first output value for the first data based on the first data and the first encryption key.

According to some embodiments, the method may further include, prior to storing the first output value in the main memory, which is the volatile memory in association with the first data, transmitting the first encryption key to a host device through a separate channel, receiving the first data and the first output value from the host device, generating, by using the one-way encryption algorithm, a seventh output value based on the first data and the first encryption key, and checking for possible tampering of the received first data by comparing the received first output value with the generated seventh output value. Storing the first output value in the main memory, which is the volatile memory in association with the first data, may include, if it is determined that the received first data has not been tampered with, storing the first data and the first output value in the main memory in association with each other.

According to some embodiments, the method may further include, prior to storing the first output value in the main memory, which is the volatile memory in association with the first data, transmitting a fourth encryption key managed by the encryption key manager through a separate channel to a host device, receiving the first data and an eighth output value associated with the first data from the host device, generating, by using the one-way encryption algorithm, a ninth output value based on the first data and the fourth encryption key, and checking for possible tampering of the received first data by comparing the received eighth output value with the generated ninth output value, and if it is determined that the received first data has not been tampered with, determining the first encryption key to be a new encryption key for the first data and generating, by using the one-way encryption algorithm, the first output value for the first data based on the first data and the first encryption key.

According to some embodiments, the first data may be data received from a host device or may be data generated by a main core that loads and drives or processes data stored in the main memory.

According to some embodiments, the method may further include, if it is determined that the first data stored in the main memory has been tampered with, stopping an operation of a main core that loads and drives or processes data stored in the main memory.

According to some embodiments, the method may further include storing an area associated with the first data in the main memory as a pre-specified value.

According to some embodiments, the method may further include copying data of an area of the main memory other than an area associated with the first data to a pre-specified area of a separate memory accessible by the security core.

According to some embodiments, the method may further include determining possible tampering of recovery data based on recovery data stored in a non-volatile memory accessible by the security core and an output value stored in association with the recovery data.

According to some embodiments, the method may further include, if it is determined that the recovery data has been tampered with, notifying a host of a failure of recovery and waiting to receive a command from the host.

According to some embodiments, the method may further include, if detecting access from the host while waiting to receive a command from the host, performing authentication on the host by using an encryption key associated with the host.

According to some embodiments, the method may further include, if it is determined that the recovery data has not been tampered with, storing the recovery data in the main memory, and resuming the operation of the main core.

According to some embodiments, the Storing the recovery data in main memory may include storing the recovery data in an area of the main memory different from the area associated with the first data.

According to some embodiments, the method may further include, after resuming the operation of the main core, if detecting tampering of at least some of the data stored in the main memory, re-stopping the operation of the main core, and notifying a host of a failure of recovery and waiting to receive a command from the host.

According to some embodiments, the method may further include, if detecting access from the host while waiting to receive a command from the host, performing authentication on the host by using an encryption key associated with the host.

According to some embodiments, the encryption key manager may be only accessible by the security core.

According to some embodiments of the present disclosure, a computing device is provided, which may include a main memory, which is volatile memory, a main core configured to load and drive or process data stored in the main memory, and a security core configured to: store a first output value, which is generated by using a one-way encryption algorithm based on first data and a first encryption key managed by an encryption key manager, in the main memory in association with the first data, generate, by using the one-way encryption algorithm, a second output value for the first data based on the first data and the first encryption key, and check for possible tampering of the first data stored in the main memory by comparing the first output value with the generated second output value, in which the encryption key manager may be accessible by the security core.

According to some embodiments, the security core may perform an integrity check on data in use stored in the main memory so as to detect possible tampering of the data stored in the main memory that may be reused.

According to some embodiments, if detecting that the data has been tampered with, the security core may perform a system protection process and/or a recovery process so as to protect and safely restart the system.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
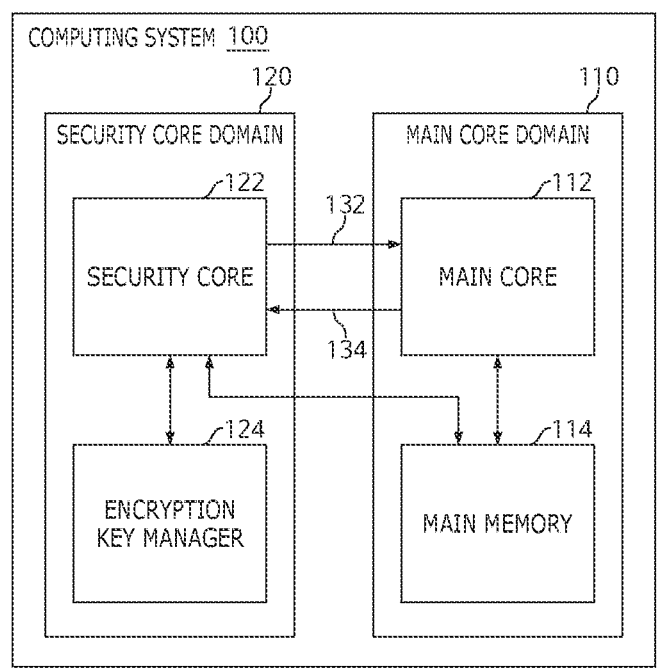
FIG. 1 is a block diagram illustrating an example of a computing system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to control one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. By way of example, each of the phrases "at least one of A, B, and C" or "at least one of A, B, or C" refers to only A, only B, or only C; any combination of A, B, and C; and/or at least one of each of A, B, and C.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, "each of a plurality of A" may refer to each of all components included in the plurality of A, or may refer to each of some of the components included in a plurality of A.

The terms "comprises", "comprising", "includes", "including", "have", "having", "contains", "containing", "carries", "carrying", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms such as "first," "second," "A," "B" and so on used in the description and claims may be used in describing a variety of elements, but the elements should not be limited by these terms. The above terms are used only for the purpose of distinguishing one element from another. In addition, terms such as "first," "second," and so on as used in each drawing are only used for the purpose of distinguishing one element from another element in that drawing, and the elements should not be limited by these terms. For example, a first element and a second element described in the same drawing may be the same as or different from each other. As another example, a first element illustrated in FIG.

Figure 5:
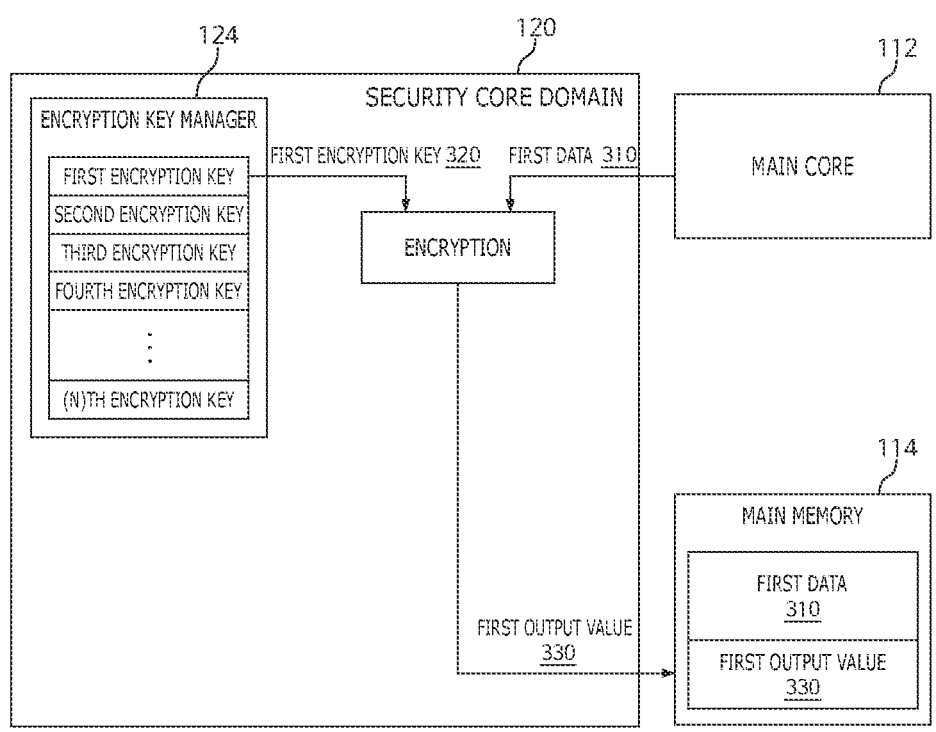
FIG. 5 is a diagram illustrating an example of a process in which data processed by a main core is stored in a main memory.

3 and a first element illustrated in FIG. 5 may be the same as or different from each other.

FIG. 1 is a block diagram illustrating an example of a computing system. According to some embodiments, a computing system 100 may be divided into a main core domain 110 and a security core domain 120. The main core domain 110 may include a main core 112 and a main memory 114, and the security core domain 120 may include a security core 122 and an encryption key manager 124. FIG. 1 illustrates only an example of the computing system 100, and is not intended to exclusively illustrate the essential components of the computing system 100, and accordingly, since FIG. 1 does not illustrate all configurations of the computing system 100, at least some of the illustrated components may be omitted and/or other components may be further included.

According to some embodiments, the main core 112 may be a core that performs computational tasks. Additionally or alternatively, the main core 112 may be a core that manages cores that perform computational tasks or that distributes tasks. For example, the main core 112 may load stored data of the main memory 114 and process (e.g., compute) or drive the data. However, aspects are not limited to the above.

The main memory 114 may be a volatile memory (memory having a characteristic that internal data is volatilized in the absence of power) belonging to the main core domain 110. The main memory 114 may be a memory for storing and/or using data and/or software during the operation of the main core 112 and the security core 122. For example, data in use may be stored in the main memory 114.

The main core domain 110 may include the main core 112 and hardware and/or software domains mainly used for computational tasks of the main core 112. For example, the main core domain 110 may include the main memory 114.

According to some embodiments, the security core 122 may be a core that performs computational tasks for security purposes. Additionally or alternatively, the security core 122 may be a core that manages cores performing computational tasks for security purposes or a core that distributes tasks. For example, the security core 122 may periodically or non-periodically perform an integrity check on at least some of the stored data of the main memory 114. In addition, since the security core 122 may be able to stop the operations of all systems except for a main core 112 when a security-related problem occurs, it may have the highest priority among the cores of the computing system 100. In this configuration, the security core 122 may be accessible to all components of the computing system 100.

When accessing the main memory 114, the security core 122 may use Direct Memory Access (DMA) dedicated to the security core to accelerate data traffic.

According to some embodiments, the encryption key manager 124 may be hardware and/or software that manages encryption keys associated with encryption and/or decryption operations performed by the security core 122. For example, the encryption key manager 124 may be a block responsible for generating and managing encryption keys. The encryption key may be generated through a dedicated core (e.g., a key derivation core) in the encryption key manager 124 block. The encryption key manager 124 may manage information on individual encryption keys (e.g., a matching relationship between data and an encryption key, a matching relationship between a host device and an encryption key, a matching relationship between a tenant and an encryption key, a matching relationship between a user and an encryption key, and the like)

Although not illustrated, there may be a separate memory in the security core domain 120. There may be an area for storing an encryption key (e.g., a key generated by the encryption key manager 124 or a key transmitted from outside the system) and individual encryption key information in a memory in the security core domain 120. Access to this area may be available only to the encryption key manager 124. Additionally or alternatively, a memory dedicated to the encryption key manager 124 may be included in the encryption key manager 124 block, and an encryption key and individual encryption key information may be stored in the memory dedicated to the encryption key manager 124. In FIG. 1, the encryption key manager 124 is illustrated as a separate component from the security core 122, but this is for convenience of explanation only, and aspects are not limited thereto. For example, at least some components of the encryption key manager 124 may be included in the security core 122.

According to some embodiments, the security core domain 120 may include the security core 122 and hardware and/or software domains to be used for the computational tasks of the security core 122. The security core domain 120 may include the encryption key manager 124. Since the security core domain 120 is an area where the security-related tasks are performed, the other components inside and outside the system, except for the security core 122, may access the security core 122 only for limited purposes such as transmitting an access request for encrypted data, and access to the security core domain 120 for all the other purposes may be limited.

According to some embodiments, a security main interconnection 132 may deliver data and control signals between the security core 122 and the main core 112. In this case, the security core 122 may have a higher priority than the main core 112. Accordingly, the security core 122 may access all parts of the main core 112 and may also instruct the main core 112 to or not to operate. Accordingly, when a security-related problem occurs, the security core 122 may stop the operation of the main core 112 and have authorization to control over the entire system. With this, if tampering of the data is detected in the integrity check process, the security core 122 may be able to smoothly perform system protection and recovery processes. For example, the security core 122 may be able to perform system protection and/or recovery processes without interruption.

According to some embodiments, a main security interconnection 134 may deliver data and control signals between the main core 112 and the security core 122. In this case, the main core 112 may access only a limited part of the security core 122 through the main security interconnection 134. Accordingly, the security of the security core 122, which is responsible for security can be maintained, and the risk of tampering of the computing system 100 can be prevented.

Figure 2:
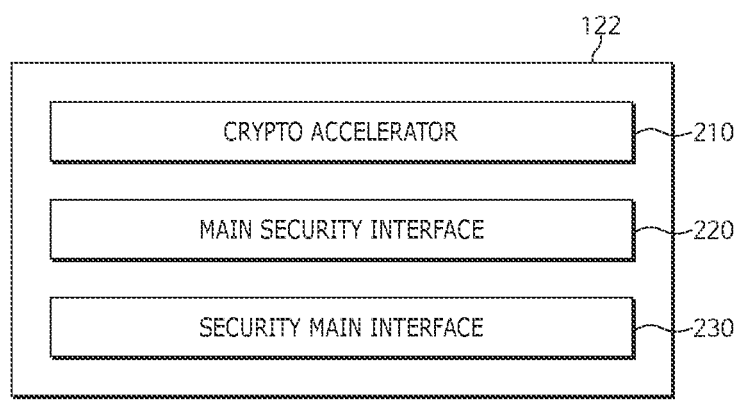
FIG. 2 is a block diagram illustrating an example of a configuration of a security core.

FIG. 2 is a block diagram illustrating an example of the internal configuration of the security core 122. FIG. 2 illustrates only an example of the internal configuration of the security core, and is not intended to exclusively illustrate the essential configurations of the security core, and accordingly, since FIG. 2 does not illustrate all internal configurations of the security core, at least some of the illustrated components may be omitted and/or other components may be further included. According to some embodiments, the security core 122 may include a crypto accelerator 210, a main-security interface 220, and a security-main interface 230.

According to some embodiments, the crypto accelerator 210 may perform crypto operations (e.g., encryption and/or decryption operations). For example, the crypto operation may include an operation using at least one of an Advanced Encryption Standard (AES) algorithm, a hash algorithm, a public/private key algorithm, and a true random number generator.

The crypto accelerator 210 may be hardware specialized for the crypto operations to allow the security core 122 to perform crypto operations smoothly. In this configuration, when the security core 122 performs an integrity check, the accuracy and speed of encryption operations can be further improved.

The main-security interface 220 and the security-main interface 230 may operate between the main core and the security core 122.

The main-security interface 220 may be connected to the main security interconnection. The main-security interface 220 together with the main security interconnection may control such that, when the main core accesses the security core 122, the main core is restricted to access only a non-security area.

The security-main interface 230 may be connected to the security main interconnection. The security-main interface 230 together with the security main interconnection may be used when the security core 122 accesses the main core. In this case, the main core may have a more restricted access to the area of the security core 122 than the access of the security core 122 to the area of the main core. With this asymmetry, the security of the security core 122 may be strengthened and the system may be prepared for the risk of system tampering. In order to implement this configuration more effectively, the main-security interface 220 and the security-main interface 230 may be physically separated from each other.

Figure 3:
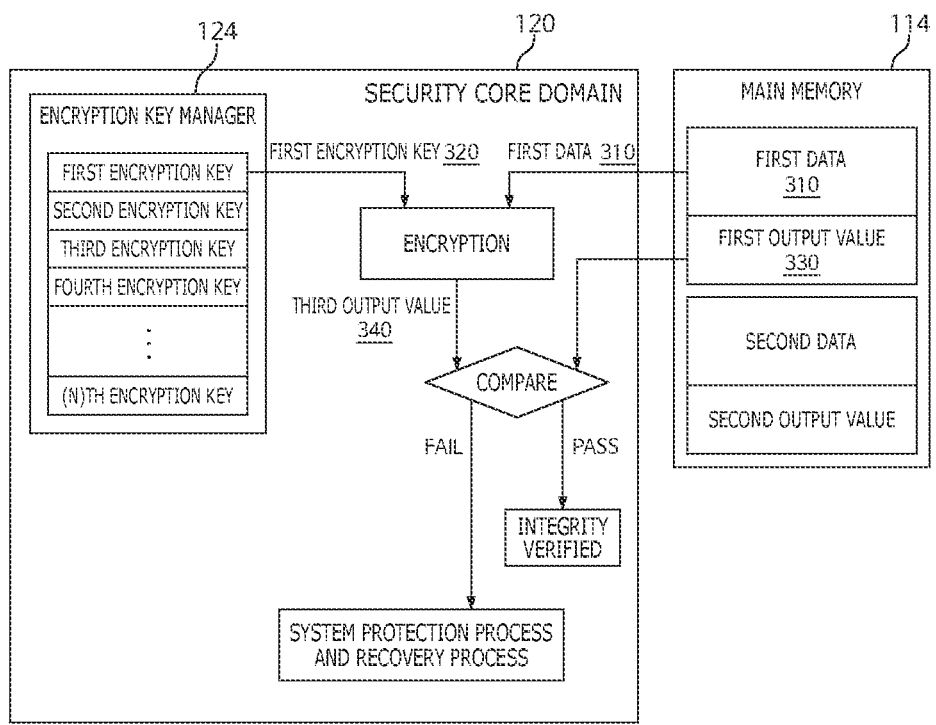
FIG. 3 is a diagram illustrating an example of a method for runtime integrity check.

FIG. 3 is a diagram illustrating an example of a method for runtime integrity check. According to some embodiments, the security core may periodically or non-periodically perform a runtime integrity check on stored data of the main memory 114. The encryption keys used for the integrity check may be managed by the encryption key manager 124 in the security core domain 120 accessible by the security core. According to some embodiments, the encryption key manager 124 may be accessible only by the security core, and may not be accessible by the components other than the security core inside and outside the system.

According to some embodiments, the security core may perform a runtime integrity check on only some data of the stored data of the main memory 114. For example, the security core may perform the runtime integrity check on data that is not frequently updated and is mainly reused, for example, data having a read-only characteristic. As a specific example, data having read-only characteristics may include firmware, page tables, and/or parameters of a trained machine learning model (e.g., kernel data of a trained neural network), and the like, but is not limited thereto.

The security core may use a one-way encryption algorithm for the integrity check. The one-way encryption algorithm may be an algorithm which ensures that an output value is changed when an input value is changed, and for which it is very difficult or impossible to do an inverse operation to derive the input value from the output value. Any of the known one-way encryption algorithms may be used for the integrity check. For example, the one-way encryption algorithm may include hash algorithms such as CRC, MD5, RIPEMD160, SHA-1, SHA-256, and SHA-512, but is not limited thereto. Hereinafter, "output value" may refer to an output value of an encryption algorithm output in response to inputting data and an encryption key to the one-way encryption algorithm.

FIG. 3 further illustrates an example of performing a runtime integrity check on first data 310 stored in the main memory 114. In the illustrated example, the first data 310 is stored in the main memory 114 in association with a first output value 330 that is generated, for example, by using an one-way encryption algorithm based on a first encryption key 320 managed by the encryption key manager 124. For example, the first output value 330 may be a hash value output in response to inputting the first data 310 and the first encryption key 320 to a hash algorithm. Matching information, which indicates that the first data 310 and the first encryption key 320 are associated with each other, may be managed by the encryption key manager 124 in the security core domain 120.

There may be various sources of the first data 310 stored in the main memory 114. For example, the first data 310 may be data loaded from a non-volatile memory accessible by the security core, data processed and generated by the main core, or data received by the host device. The process of storing the first data 310 in the main memory 114 may vary depending on the source of the first data 310. If the first data 310 is the data loaded from a non-volatile memory accessible by the security core or if the first data 310 is the data received from the host device, the security core may first perform a preliminary integrity check on the first data 310 and then store the first data 310 in the main memory 114. The process of storing the first data 310 in the main memory 114 according to the source of the first data 310 will be described below in detail with reference to FIGS. 4a to 6.

According to some embodiments, for the runtime integrity check, first, the security core may generate, for example, by using a one-way encryption algorithm, a third output value 340 for the first data 310 based on the first data 310 and the first encryption key 320 stored in the main memory 114. For example, the first output value 340 may be a hash value output in response to the security core inputting the first data 310 and the first encryption key 320 to a hash algorithm. When loading data from the main memory 114 or storing data in the main memory 114, the security core may use Direct Memory Access (DMA) dedicated to the security core to accelerate data traffic.

According to some embodiments, the security core may compare the stored first output value 330 with the generated third output value 340 to check for possible tampering of the first data 310 stored in the main memory 114. The security core may periodically or non-periodically perform this integrity check.

If the result of checking for possible tampering reveals that the first output value 330 and the third output value 340 do not match with each other, it may be determined that the first data 310 stored in the main memory 114 has been tampered with. If it is determined that the first data 310 has been tampered with, the security core may perform a system protection process and a recovery process. The method for performing a system protection process and a recovery process by the security core will be described below in detail with reference to FIGS. 7 and 8. If the first output value 330 and the third output value 340 match with each other, the integrity of the first data 310 stored in the main memory 114 may be verified.

If the same key is continuously used for integrity check, there is a possibility of exposure to security risks. According to some embodiments, in order to prevent the exposure to security risks, the security core may periodically change an encryption key and regenerate and store an output value. For example, the security core may generate, for example, by using a one-way encryption algorithm, a new output value based on the first data 310 and the second encryption key managed by the encryption key manager 124, and store the new output value in the main memory 114 in association with the first data 310.

Figure 4A:
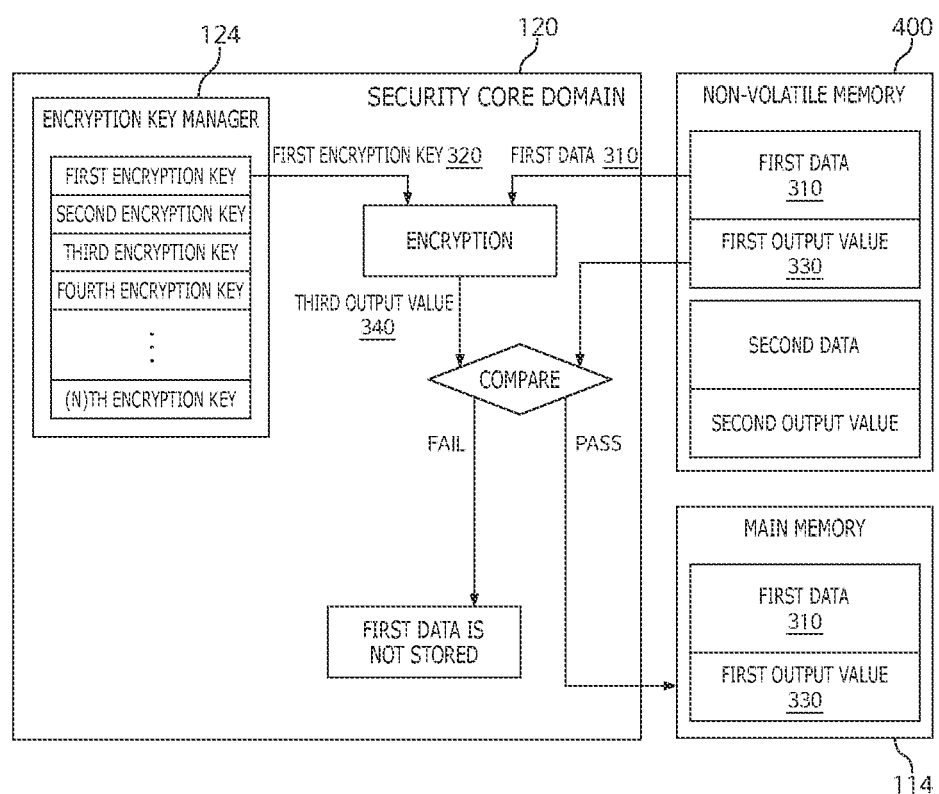
FIG. 4A is a diagram illustrating an example of a process in which stored data of a non-volatile memory is stored in a main memory.

FIG. 4A is a diagram illustrating an example of a process in which stored data of a non-volatile memory 400 is stored in the main memory 114. According to some embodiments, the first data 310 stored in the non-volatile memory 400 may be loaded and stored in the main memory 114. In this case, the security core may perform a preliminary integrity check on the first data 310 by using the first output value 330 stored in the non-volatile memory 400 in association with the first data 310, and store the first data 310 in the main memory 114.

In FIG. 4A, the first output value 330 stored in the non-volatile memory 400 may be a value output using the first encryption key 320. The matching information between the data and the encryption key may be managed by the encryption key manager 124 in the security core domain 120.

For the preliminary integrity check on the first data 310, the security core may generate, for example, by using a one-way encryption algorithm, the third output value 340 based on the first data 310 and the first encryption key 320 stored in the non-volatile memory 400.

By comparing the first output value 330 associated with the first data 310 and stored in the non-volatile memory 400 with the generated third output value 340, it is possible to check for possible tampering of the first data 310 stored in the non-volatile memory 400.

According to some embodiments, if it is determined as a result of checking for possible tampering that the first data 310 stored in the non-volatile memory 400 has not been tampered with, the security core may store the first data 310 and the first output value 330 in the main memory 114 in association with each other. In contrast, if it is determined that the first data 310 stored in the non-volatile memory 400 has been tampered with, the security core may determine not to store the first data 310 in the main memory 114.

The security core may periodically or non-periodically perform the runtime integrity check described above with reference to FIG. 3, using the first data 310 and the first output value 330 stored in the main memory 114.

Figure 4B:
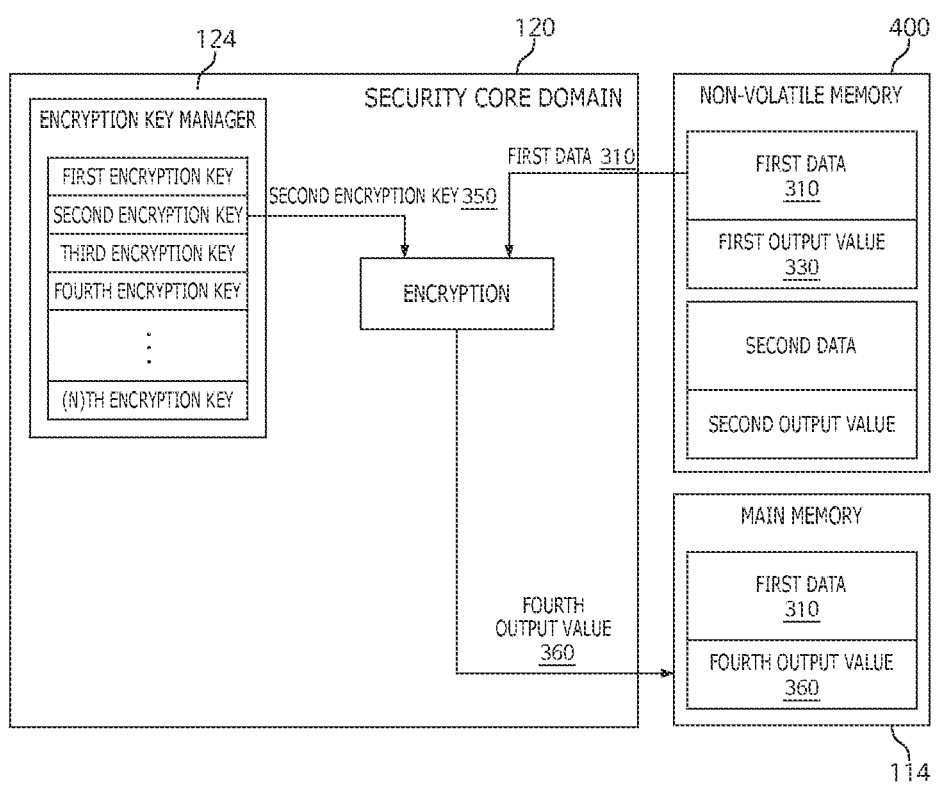
FIG. 4B is a diagram illustrating an example of a process in which stored data of a non-volatile memory is stored in a main memory.

FIG. 4B is a diagram illustrating an example of a process in which stored data of the non-volatile memory 400 is stored in the main memory 114. As described above, when determining as a result of the preliminary integrity check on the first data 310 stored in the non-volatile memory 400 that the first data 310 has not been tampered with, the security core may change an encryption key to a new encryption key, regenerate an output value, and store the output value in the main memory 114, instead of storing the first data 310 and the first output value 330 as they are in the main memory 114, as shown in FIG. 4A.

For example, upon completing the integrity check on the first data 310 stored in the non-volatile memory 400, the security core may determine a second encryption key 350 to be a new encryption key for the first data 310, and generate, for example, by using a one-way encryption algorithm, a fourth output value 360 for the first data 310 based on the first data 310 and the second encryption key 350. The security core may store the fourth output value 360 in the main memory 114 in association with the first data 310. The matching information of the encryption key may be updated such that the first data 310 stored in the main memory 114 is associated with the second encryption key 350 instead of the first encryption key 320.

The security core may periodically or non-periodically perform the runtime integrity check described above with reference to FIG. 3, using the first data 310 and the fourth output value 360 stored in the main memory 114.

FIG. 5 is a diagram illustrating an example of a process in which data processed by the main core 112 is stored in the main memory 114. According to some embodiments, the first data 310 may be data processed and generated by the main core 112. In this case, without separate preliminary integrity check, the security core may generate, for example using a one-way encryption algorithm, the first output value 330 based on the first data 310 and the first encryption key 320 managed by the encryption key manager 124. The security core may store the first data 310 and the first output value 330 in the main memory 114 in association with each other. In addition, the security core may store, in the area where the matching information of the encryption key is stored, the first data 310 stored in the main memory 114 as being associated with the first encryption key 320.

The security core may periodically or non-periodically perform the runtime integrity check described above with reference to FIG. 3, using the first data 310 and the first output value 330 stored in the main memory 114.

The process described above with reference to FIG. 5 may be similarly applied even when the first data 310 is the data received from the host device rather than the data processed and generated by the main core 112. For example, if only the first data 310 is received without a separate output value from the host device, likewise the process described above with reference to FIG. 5, the security core may generate the first output value 330 and store the received first data 310 and the generated first output value 330 in the main memory 114 in association with each other. According to some embodiments, if the security core pre-exchanges an encryption key with the host device through a separate secure channel and then receives both the data and the output values from the host device, the preliminary integrity check may be performed, as described below with reference to FIG. 6.

Figure 6:
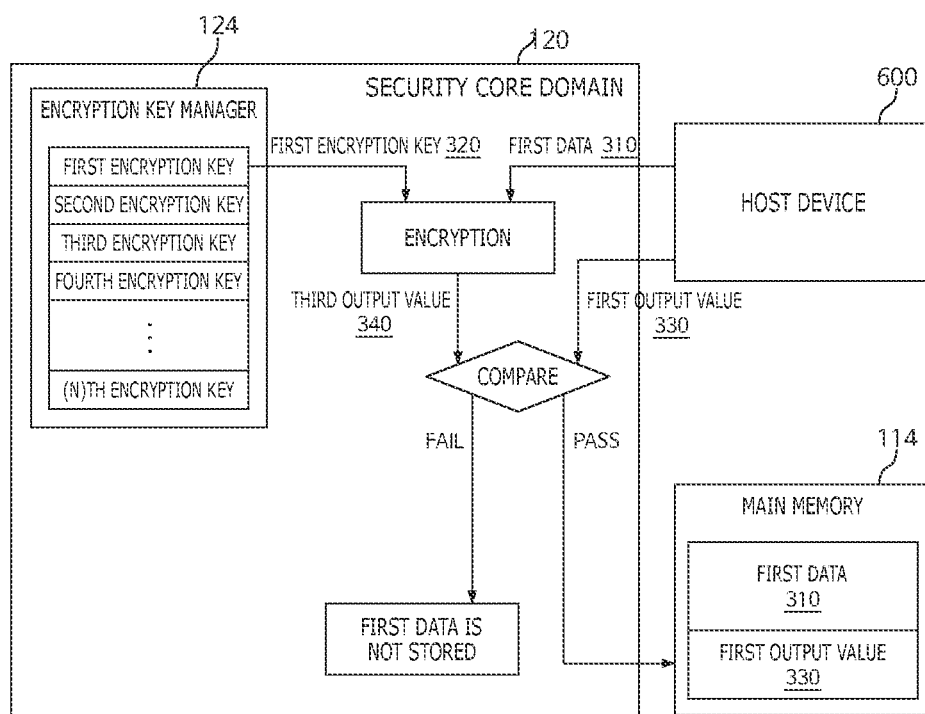
FIG. 6 is a diagram illustrating an example of a process in which data received from a host device is stored in a main memory.

FIG. 6 is a diagram illustrating an example of a process in which data received from a host device 600 is stored in the main memory 114. The security core may exchange an encryption key with the host device 600 through a separate secure channel. For example, a separate secure channel may be formed between the security core and the host device 600. The security core may transmit the first encryption key 320 through a separate secure channel using an encryption key exchange algorithm (e.g., ECDH algorithm). In addition, matching information, which indicates that the data received by the host device 600 and the first encryption key 320 are associated with each other, may be stored in a memory area managed by the encryption key manager 124 in the security core domain 120.

The security core may receive the first data 310 and the first output value 330 from the host device 600. In this case, the security core may perform a preliminary integrity check on the first data 310. First, the security core may generate, for example, by using a one-way encryption algorithm, the third output value 340 based on the received first data 310 and the first encryption key 320. By comparing the received first output value 330 with the generated third output value 340, the security core may check for possible tampering of the first data 310 received from the host device 600.

According to some embodiments, if it is determined as a result of checking for possible tampering that the received first data 310 has not been tampered with, the security core may store the first data 310 and the first output value 330 in the main memory 114 in association with each other. In contrast, if it is determined that the received first data 310 has been tampered with, the security core may determine not to store the first data 310 in the main memory 114.

The security core may periodically or non-periodically perform the runtime integrity check described above with reference to FIG. 3, using the first data 310 and the first output value 330 stored in the main memory 114.

According to some embodiments, when determining that the received first data 310 has not been tampered with, as described above with reference to FIG. 4B, the security core may change the encryption key to a new encryption key, regenerate an output value, and store the regenerated output value in the main memory 114, instead of storing the first data 310 and the first output value 330 as they are in the main memory 114.

Figure 7:
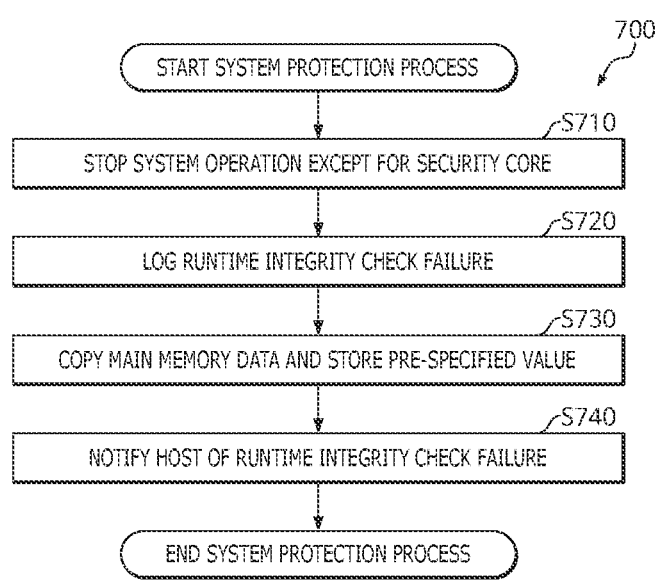
FIG. 7 is a diagram illustrating an example of a system protection process.

FIG. 7 is a diagram illustrating an example of a system protection process 700. According to some embodiments, if it is determined as a result of the runtime integrity check that the first data stored in the main memory has been tampered with, the security core may start the system protection process 700 by immediately stopping the operation of the entire system including the main core, at S710. The main core may maintain an operation suspension state (wait for interrupt) until an operation resume command is received from the security core. During this process, the operation of the security core may not be stopped.

The security core may record a log indicating that the runtime integrity check fails, at S720. For example, the security core may store log information necessary for analyzing a problem situation, in a separate memory (memory accessible only by the security core) in the security core domain.

The security core may copy the data of the main memory and/or store (rewrite) a pre-specified value in the main memory, at S730. For example, the security core may store the entire area of the main memory or an area of the main memory associated with the first data for which tampering is detected, as a pre-specified value (e.g., 0). Before storing the entire area of the main memory as a pre-specified value, the security core may copy the data of the area of the main memory, excluding the area associated with the first data for which tampering is detected, to a pre-specified area of a separate memory accessible by the security core.

The security core may end the system protection process by notifying the host of the failure of the runtime integrity check, using an interrupt, at S740. The security core may perform a recovery process for restarting the system.

Figure 8:
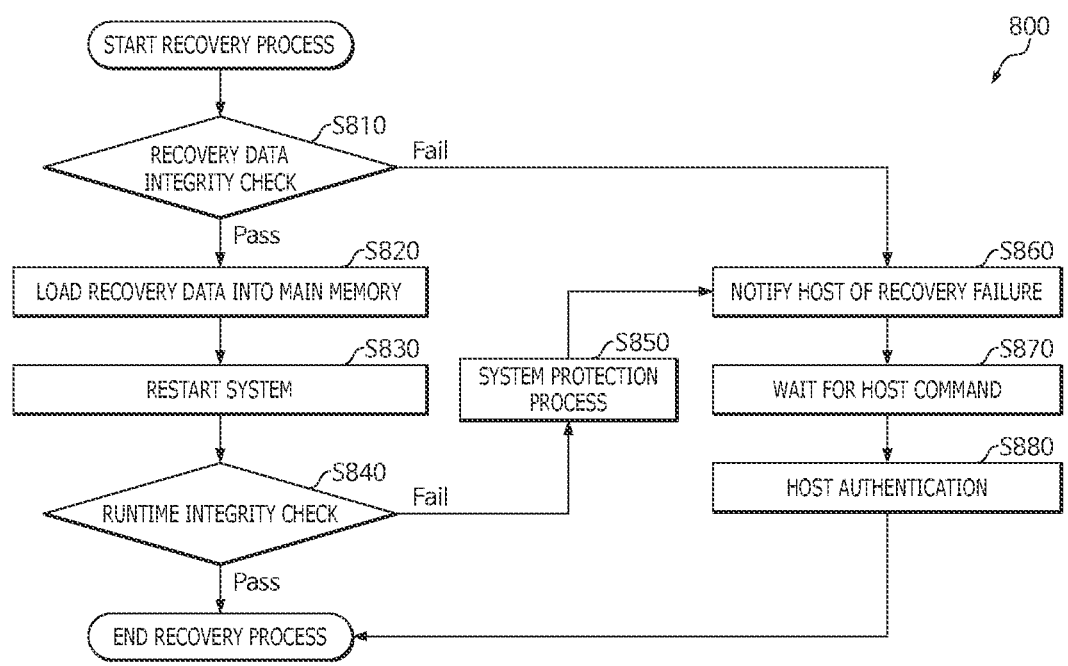
FIG. 8 illustrates an example of a recovery process.

FIG. 8 illustrates an example of a recovery process 800. According to some embodiments, the security core may perform the recovery process 800 for restarting the system after performing the system protection process 700 described above. According to some embodiments, at least part of the system protection process 700 and at least part of the recovery process 800 may be performed in parallel.

First, the security core may check the integrity of the recovery data, at S810. For example, the security core may determine possible tampering of the recovery data based on reliable recovery data (e.g., firmware, page table, and the like) stored separately in a non-volatile memory accessible by the security core and output values (e.g., hash values) stored in association with the recovery data. Determining the possible tampering may be performed in the same or similar manner to the integrity check process described above with reference to FIG. 3.

If it is determined as a result of S810 that the recovery data has not been tampered with, the security core may load the recovery data into the main memory at S820 and restart the operation of the main core at S830. For example, the security core may store the recovery data in an area of the main memory different from an area associated with the first data for which tampering is detected.

After the system is restarted, the security core may perform the integrity check process described above with reference to FIG. 3 temporarily, periodically, non-periodically, and/or for a pre-specified period, at S840. If the result of the runtime integrity check reveals no abnormality, the recovery process may be ended. In contrast, if it is determined during the runtime integrity check process that at least some stored data of the main memory has been tampered with, the security core may perform the system protection process 700 described above again, at S850.

If it is determined as a result of S810 that the recovery data has been tampered with, or, if the re-executing the system protection process 700 of S850 is completed, the security core may notify the host of the failure of recovery using an interrupt at S860 and wait for a command from the host at S870.

If the security core detects that the host is accessing the system while waiting to receive the command from the host, the security core may authenticate the access of the host to the system by assuming that the host is subjected to a malicious attack. For example, the authentication process may be performed using an encryption key associated with a host managed by the encryption key manager. In addition, for confidentiality, the authentication may be performed using a bi-directional encryption algorithm (e.g., symmetric key encryption algorithms such as AES and SEED or asymmetric key encryption algorithms such as RSA and DSA).

Figure 9:
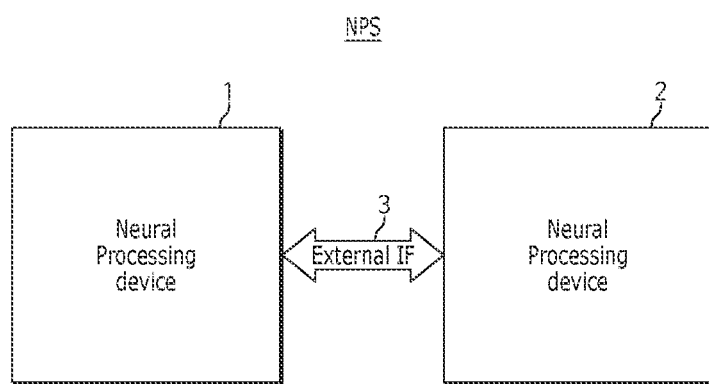
FIG. 9 is a block diagram provided to explain an example of a neural processing system.

FIG. 9 is a block diagram provided to explain an example neural processing system. Referring to FIG. 9, a neural processing system (NPS) may include a first neural processing device 1, a second neural processing device 2, and an external interface 3.

The first neural processing device 1 may be a device that performs computations using an artificial neural network. The first neural processing device 1 may be a device specialized for performing a deep learning computational task, for example. However, aspects are not limited to the above.

The second neural processing device 2 mayhave a configuration identical or similar to that of the first neural processing device 1. The first neural processing device 1 and the second neural processing device 2 may be connected to each other through the external interface 3 to share data and control signals.

Although FIG. 9 illustrates two neural processing devices, the neural processing system (NPS) is not limited thereto. For example, in the neural processing system (NPS), three or more neural processing devices may be connected to each other through the external interface 3. In addition, conversely, a neural processing system (NPS) may include only one neural processing device.

In this case, each of the first neural processing device 1 and the second neural processing device 2 may be a processing device other than the neural processing device. For example, the first neural processing device 1 and the second neural processing device 2 may 2 may be a graphics processing unit (GPU), a central processing unit (CPU), or other types of processing devices, respectively. Hereinafter, for convenience, the first neural processing device 1 and the second neural processing device 2 will be described as neural processing devices.

Figure 10:
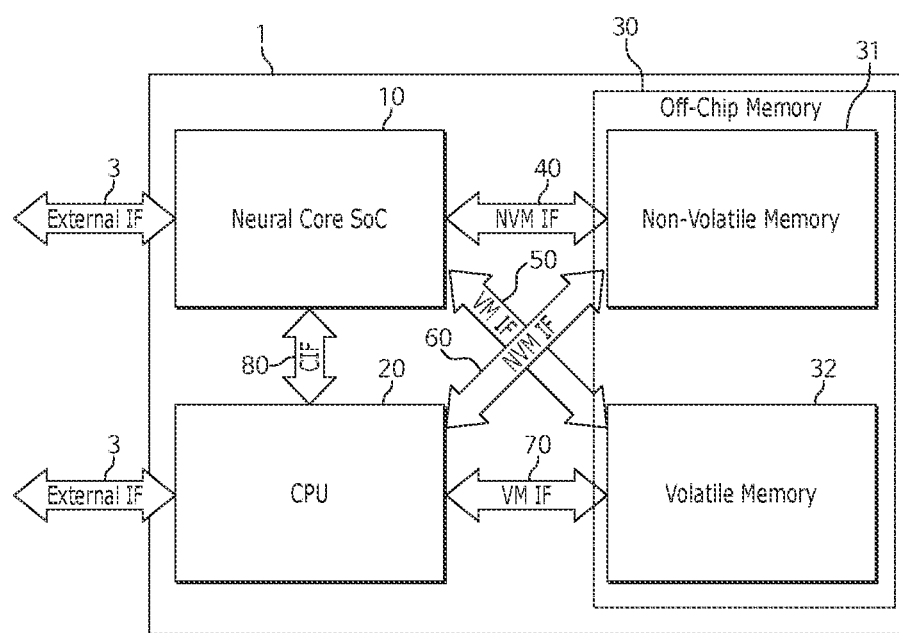
FIG. 10 is a block diagram provided to explain the example neural processing device of FIG. 9 in detail.

FIG. 10 is a block diagram provided to explain the example neural processing device of FIG. 9 in detail. Referring to FIG. 10, the first neural processing device 1 may include a neural core SoC 10, a CPU 20, an off-chip memory 30, a first non-volatile memory interface 40, a first volatile memory interface 50, a second non-volatile memory interface 60, a second volatile memory interface 70, and a control interface (CIF) 80.

The neural core SoC 10 may be a System on Chip device. The neural core SoC 10 may be an artificial intelligence computing unit and may be an accelerator. The neural core SoC 10 may be any one of a graphics processing unit (GPU), a field programmable gate array (FPGA), or an application-specific integrated circuit (ASIC), for example. However, aspects of the present disclosure are not limited to the above.

The neural core SoC 10 may exchange data with other external computing units through the external interface 3. In addition, the neural core SoC 10 may be connected to a non-volatile memory 31 and a volatile memory 32 through the first non-volatile memory interface 40 and the first volatile memory interface 50, respectively.

The CPU 20 may be a controller that controls the system of the first neural processing device 1 and executes the program operations. The CPU 20 may be a general-purpose computing unit and may have too low efficiency to perform parallel simple computations widely used in deep learning. Accordingly, the neural core SoC 10 may perform computations for deep learning reasoning and learning tasks, thus achieving high efficiency.

The CPU 20 may exchange data with other external computing units through the external interface 3. In addition, the CPU 20 may be connected to the non-volatile memory 31 and the volatile memory 32 through the second non-volatile memory interface 60 and the second volatile memory interface 70, respectively.

The CPU 20 may also pass a task to the neural core SoC 10 in a command. In this case, the CPU 20 may be a kind of host that gives instructions to the neural core SoC 10. For example, the neural core SoC 10 may efficiently perform parallel computational tasks such as deep learning tasks according to instructions of the CPU 20.

In addition, the CPU 20 may receive a command or task from an external host, and control the first neural processing device 1 based on the received command or task and execute the program operations. In addition, the CPU 20 may also control a neural processing device other than the first neural processing device 1 including the CPU 20 and execute the program operations.

The off-chip memory 30 may be a memory disposed outside a chip of the neural core SoC 10. The off-chip memory 30 may include the non-volatile memory 31 and the volatile memory 32.

The non-volatile memory 31 may be a memory that continuously retains stored information even when there is no power supply. For example, the non-volatile memory 31 may include at least one of a Read-Only Memory (ROM), a Programmable Read-Only Memory (PROM), an Erasable Alterable ROM (EAROM), an Erasable Programmable Read-Only Memory (EPROM), an Electrically Erasable Programmable Read-Only Memory (EEPROM) (e.g., a NAND flash memory, a NOR flash memory), an Ultra-Violet Erasable Programmable Read-Only Memory (UVE-PROM), a Ferroelectric Random Access Memory (FeRAM), a Magnetoresistive Random Access Memory (MRAM), a Phase-change Random Access Memory (PRAM), a silicon-oxide-nitride-oxide-silicon (SONOS), a Resistive Random Access Memory (RRAM), a Nanotube Random Access Memory (NRAM), a magnetic computer storage devices such as hard disks, and a magnetic computer storage device (e.g., hard disk, diskette drive, magnetic tape), an optical disk drive, and 3D XPoint memory. However, aspects of the present disclosure are not limited to the above.

Unlike the non-volatile memory 31, the volatile memory 32 may be a memory that continuously requires power to maintain stored information. For example, the volatile memory 32 may include at least one of a Dynamic Random Access Memory (DRAM), a Static Random Access Memory (SRAM), a Synchronous Dynamic Random Access Memory (SDRAM), and a Double Data Rate SDRAM (DDR SDRAM). However, aspects are not limited to the above.

For example, each of the first non-volatile memory interface 40 and the second non-volatile memory interface 60 may include at least one of a Parallel Advanced Technology Attachment (PATA), a Small Computer System Interface (SCSI), a Serial Attached SCSI (SAS), a Serial Advanced Technology Attachment (SATA), and a PCI Express (PCIe). However, aspects of the present disclosure are not limited to the above.

For example, each of first volatile memory interface 50 and the second volatile memory interface 70 may be at least one of a Single Data Rate (SDR), a Double Data Rate (DDR), a Quad Data Rate (QDR), an eXtreme Data Rate (XDR), and an octal data rate (ODR). However, aspects of the present disclosure are not limited to the above.

The control interface 80 may be an interface for delivering control signals between the CPU 20 and the neural core SoC 10. The control interface 80 may transmit a command of the CPU 20 and transmit a response of the neural core SoC 10 to the command. For example, the control interface 80 may be PCI Express (PCIe), but is not limited thereto.

Figure 11:
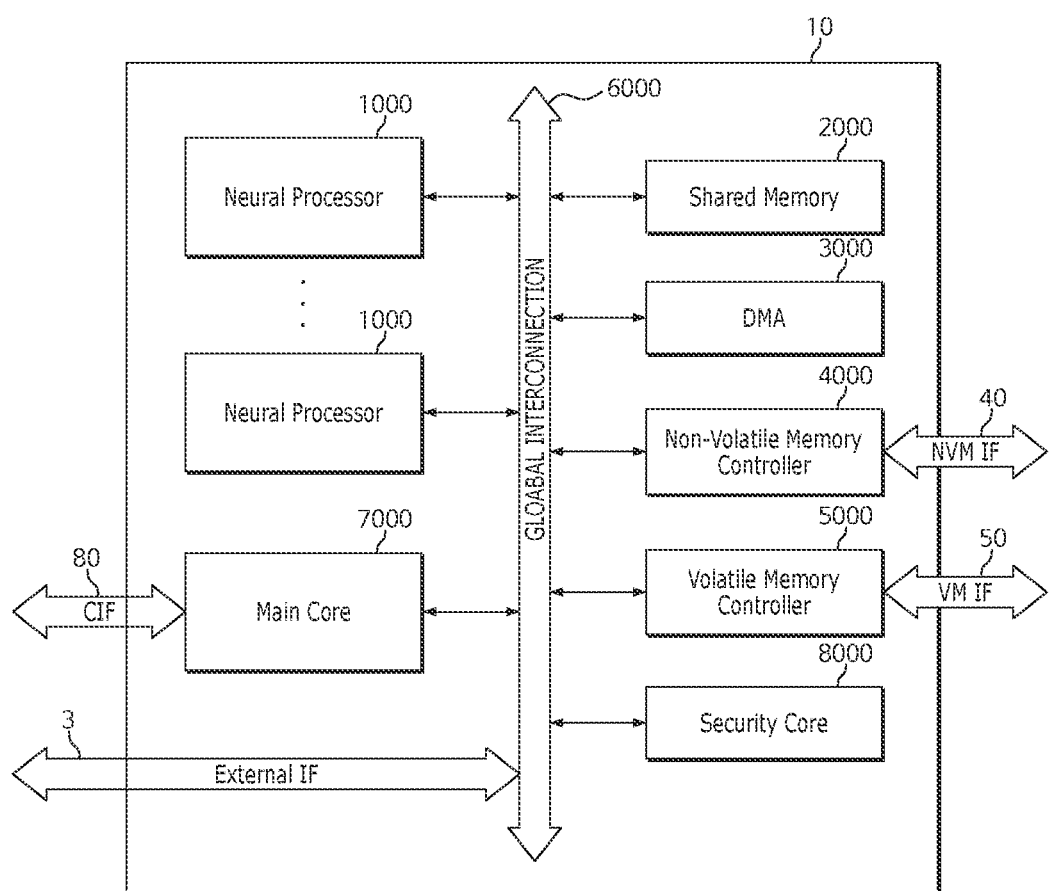
FIG. 11 is a block diagram provided to explain the example neural core SoC of FIG. 10 in detail.

FIG. 11 is a block diagram provided to explain the neural core SoC of FIG. 10 in detail. FIGS. 10 and 11, the neural core SoC 10 may include at least one neural processor 1000, a shared memory 2000, a Direct Memory Access (DMA) 3000, a non-volatile memory controller 4000, a volatile memory controller 5000, a main core 7000, a security core 8000, and a global interconnection 6000.

The neural processor 1000 may be a computing unit that directly performs computational tasks. If there are a plurality of neural processors 1000, the computational tasks may be allocated to each of the neural processors 1000. Each of the neural processors 1000 may be connected to each other through the global interconnection 6000.

The shared memory 2000 may be a memory shared by several neural processors 1000. The shared memory 2000 may store data of each neural processor 1000. In addition, the shared memory 2000 may receive data from the off-chip memory 30, temporarily store the data, and transmit the data to each neural processor 1000. Conversely, the shared memory 2000 may receive data from the neural processor 1000, temporarily store the data, and transmit the data to the off-chip memory 30 of FIG. 10.

The shared memory 2000 may require a relatively fast memory. Accordingly, the shared memory 2000 may include SRAM, for example. However, aspects of the present disclosure are not limited to the above. For example, the shared memory 2000 may include DRAM.

The shared memory 2000 may be a memory corresponding to an SoC level, for example, to level 2 (L2). Accordingly, the shared memory 2000 may be defined as the L2 shared memory.

The DMA 3000 can directly control data movement without requiring the CPU 20 or the neural processor 1000 to control input/output of data. Accordingly, the DMA 3000 may control the data movement between memories to minimize the number of interrupts of the CPU 20 or neural processor 1000.

The DMA 3000 may control the data movement between the shared memory 2000 and the off-chip memory 30. The non-volatile memory controller 4000 and the volatile memory controller 5000 may perform the movement of data through the authority of the DMA 3000.

The non-volatile memory controller 4000 may control read or write operation of the non-volatile memory 31. The non-volatile memory controller 4000 may control the non-volatile memory 31 through the first non-volatile memory interface 40.

The volatile memory controller 5000 may control the read or write operation of the volatile memory 32. In addition, the volatile memory controller 5000 may perform a refresh operation of the volatile memory 32. The volatile memory controller 5000 may control the volatile memory 32 through the first volatile memory interface 50.

The main core 7000 may be connected to the control interface 80. The main core 7000 may receive a control signal from the CPU 20 through the control interface 80. The main core 7000 may generate a task through a control signal received from the CPU 20 and transmit the task to each neural processor 1000. In addition, the main core 7000 may receive a task completion report from each neural processor 1000. The main core 7000 may also be referred to as a command processor.

The global interconnection 6000 may connect at least one neural processor 1000, the shared memory 2000, the DMA 3000, the non-volatile memory controller 4000, the main core 7000, and the volatile memory controller 5000 to each other. In addition, the external interface 3 may also be connected to the global interconnection 6000. The global interconnection 6000 may be a path through which data moves between at least one neural processor 1000, the shared memory 2000, the DMA 3000, the non-volatile memory controller 4000, the volatile memory controller 5000, the main core 7000 and the external interface 3.

The global interconnection 6000 may transmit not only the data, but also control signals and signals for synchronization.

The security core 8000 may be a device for performing an integrity check. The main core 7000 and the security core 8000 of FIG. 11 may correspond to the main core 112 and the security core 122 of FIG. 1, respectively.

Figure 12:
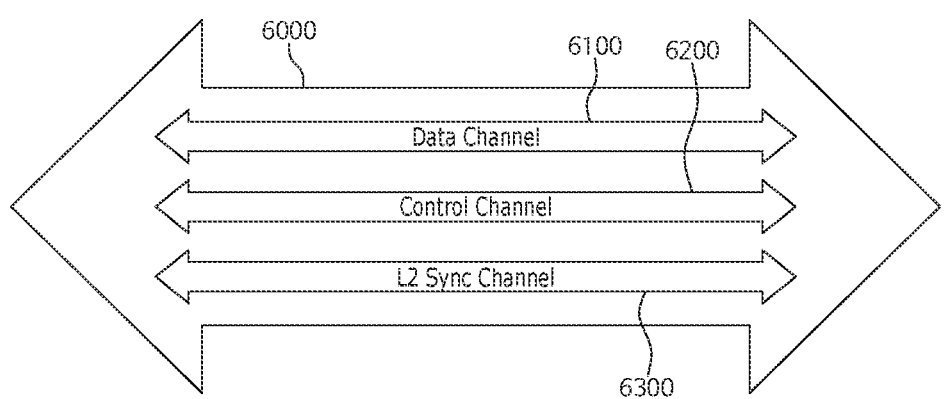
FIG. 12 is a structural diagram provided to explain the global interconnection of FIG. 11 in detail.

FIG. 12 is an example structural diagram provided to explain the global interconnection of FIG. 11 in detail. Referring to FIG. 12, the global interconnection 6000 may include a data channel 6100, a control channel 6200, and an L2 sync channel 6300.

The data channel 6100 may be a dedicated channel for transmitting data. Through the data channel 6100, at least one neural processor 1000, the shared memory 2000, the DMA 3000, the non-volatile memory controller 4000, the volatile memory controller 5000, and the external interface 3 may exchange data with each other.

The control channel 6200 may be a dedicated channel for transmitting control signals. Through the control channel 6200, at least one neural processor 1000, the shared memory 2000, the DMA 3000, the non-volatile memory controller 4000, the volatile memory controller 5000, the main core 7000, and the external interface 3 may exchange control signals with each other. In particular, the main core 7000 may transmit various control signals to each of the neural processors 1000.

The L2 sync channel 6300 may be a dedicated channel for transmitting synchronization signals. Through the L2 sync channel 6300, at least one neural processor 1000, the shared memory 2000, the DMA 3000, the non-volatile memory controller 4000, the volatile memory controller 5000, the main core 7000, and the external interface 3 may exchange the synchronization signals with each other.

The L2 sync channel 6300 is set as a dedicated channel inside the global interconnection 6000 so as to allow fast transmission of the synchronization signals without overlapping with other channels. Accordingly, the neural processing device may smoothly perform synchronization using the existing global interconnection 6000 without requiring new wiring work.

Figure 13:
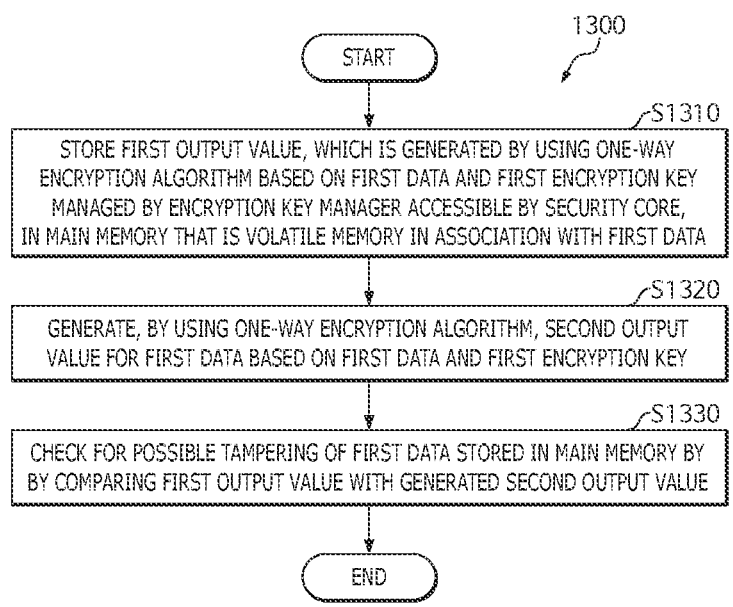
FIG. 13 is a flowchart illustrating an example of a method for runtime integrity check.

FIG. 13 is a flowchart illustrating an example of a method 1300 for runtime integrity check. The method 1300 may be performed by a security core including one or more processors.

According to some embodiments, the security core may store a first output value, which is generated, for example, by using a one-way encryption algorithm based on the first data and the first encryption key managed by the encryption key manager accessible by the security core, in a main memory that is a volatile memory in association with the first data, at S1310. The encryption key manager managing encryption keys may be accessible only by the security core, and may not be accessible by the components other than the security core inside the system or outside the system.

The first data stored in the main memory may be subject to integrity check. In the data stored in the main memory, the first data that is subjected to integrity check may be data that is not frequently updated and is mainly reused (for example, data having a read-only characteristic). For example, the first data may be data associated with at least one of firmware, a page table, or parameters of a trained machine learning model (e.g., kernel data of a trained neural network).

There may be various sources of the first data stored in the main memory. For example, the first data may be loaded from a non-volatile memory accessible by the security core, or may be data processed by the main core, or may be data received by the host device. If the first data is the data loaded from a non-volatile memory accessible by the security core or if the first data is the data received from the host device, the security core may first perform an integrity check on the first data and then store the first data in the main memory.

For example, if the first data is the data loaded from the non-volatile memory, the security core may generate, by using a one-way encryption algorithm, a fourth output value based on the first data and the first encryption key stored in the non-volatile memory. The first output value stored in the non-volatile memory in association with the first data may be compared with the generated fourth output value so as to check for possible tampering of the first data stored in the non-volatile memory. The security core may store the first data and the first output value in the main memory in association with each other, only if it is determined as a result of checking for possible tampering that the first data stored in the non-volatile memory has not been tampered with.

According to some embodiments, the security core may change the encryption key associated with the output value stored in the non-volatile memory to a new encryption key, regenerate the output value, and store the regenerated output value in the main memory. For example, an output value generated based on the first data and a third encryption key managed by the encryption key manager may be stored in the non-volatile memory in association with the first data. The security core may generate a fifth output value based on the first data stored in the non-volatile memory and the third encryption key. The security core may compare a sixth output value stored in the non-volatile memory in association with the first data with the generated fifth output value so as to check for possible tampering of the first data stored in the non-volatile memory. If it is determined that the first data stored in the non-volatile memory has not been tampered with, the security core may determine the first encryption key to be a new encryption key for the first data and generate, for example, by using the one-way encryption algorithm, the first output value for the first data based on the first data and the first encryption key. The security core may store the first output value in the main memory in association with the first data.

As another example, the first data may be received from the host device. When only the first data is received from the host device, the security core may store the first data in the main memory in association with the first output value without a preliminary integrity check process. According to some embodiments, the first data and the output value may be received together from the host device. This presupposes that the encryption key has been transmitted to the host device through a separate secure channel in advance.

As a specific example, the security core may transmit the first encryption key to the host device through a separate secure channel in advance. The security core may receive the first data and the first output value from the host device. In this case, the security core may generate, for example, by using a one-way encryption algorithm, a seventh output value based on the first data and the first encryption key, and compare the received first output value with the generated seventh output value so as to check for possible tampering of the received first data. If it is determined that the received first data has not been tampered with, the security core may store the first data and the first output value in the main memory in association with each other.

According to some embodiments, the security core may change the encryption key to a key different from the encryption key transmitted to the host device, regenerate the output value, and store the regenerated output value in the main memory. For example, the security core may transmit the fourth encryption key managed by the encryption key manager to the host device through a separate security channel in advance. The security core may receive the first data and an eighth output value associated with the first data from the host device. In this case, the security core may generate, for example, by using a one-way encryption algorithm, a ninth output value based on the first data and the fourth encryption key, and compare the received eighth output value with the generated ninth output value so as to check for possible tampering of the received first data. If it is determined that the received first data has not been tampered with, the security core may determine the first encryption key to be a new encryption key for the first data and generate, for example, by using the one-way encryption algorithm, the first output value for the first data based on the first data and the first encryption key. The security core may store the first output value in the main memory in association with the first data.

The security core may periodically or non-periodically perform a runtime integrity check on the first data stored in the main memory. To this end, the security core may first generate, for example, by using a one-way encryption algorithm, a second output value for the first data based on the first data and the first encryption key stored in the main memory, at S1320. The security core may compare the first output value with the generated second output value so as to check for possible tampering of the first data stored in the main memory, at S1330.

If it is determined as a result of checking for possible tampering that the first output value and the second output value do not match each other, it may be determined that the first data stored in the main memory has been tampered with, and the security core may perform the system protection process and recovery process described above with reference to FIGS. 7 and 8.

In order to prevent security vulnerability due to continuous use of the same key, the security core may periodically change the encryption key, and regenerate and store the output value. For example, the security core may generate, by using a one-way encryption algorithm, a third output value based on the first data and the second encryption key managed by the encryption key manager, and store the third output value in the main memory in association with the first data.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. According to some embodiments, the storage medium may be integrated into the processor. The processor and the storage medium may exist in the ASIC. The ASIC may exist in the user terminal. According to some embodiments, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for runtime integrity check, the method being performed by a security core including one or more processors and comprising:
   obtaining a first data and a first output value associated with the first data, wherein the first data and the first output value are stored in association with each other in a non-volatile memory accessible by the security core, or the first data and the first output value are received from a host device,
   generating, by using the one-way encryption algorithm, a second output value for the first data based on the first data and a first encryption key, wherein the first encryption key is managed by an encryption key manager accessible by the security core,
   checking for possible tampering of the obtained first data by comparing the obtained first output value with the generated second output value,
   based on determining that the obtained first data has not been tampered with, storing a third output value, which is generated by using the one-way encryption algorithm based on the first data and a second encryption key managed by the encryption key manager, in a main memory that is a volatile memory in association with the first data,
   generating a fourth output value for the first data based on the first data and the second encryption key by using the one-way encryption algorithm, and
   checking for possible tampering of the first data stored in the main memory by comparing the stored third output value with the generated fourth output value.

2. A processing device, comprising:
   a main memory, which is a volatile memory;
   a main core configured to load and drive or process data stored in the main memory; and
   a security core configured to:
      obtain a first data and a first output value associated with the first data, wherein the first data and the first output value are stored in association with each other in a non-volatile memory accessible by the security core, or the first data and the first output value are received from a host device, generate, by using the one-way encryption algorithm, a second output value for the first data based on the first data and a first encryption key, wherein the first encryption key is managed by an encryption key manager accessible by the security core, check for possible tampering of the obtained first data by comparing the obtained first output value with the generated second output value, based on determining that the obtained first data has not been tampered with, store a third output value, which is generated by using the one-way encryption algorithm based on the first data and a second encryption key managed by the encryption key manager, in the main memory in association with the first data, generate, by using the one-way encryption algorithm, a fourth output value for the first data based on the first data and the second encryption key, and check for possible tampering of the first data stored in the main memory by comparing the stored third output value with the generated fourth output value.

3. The processing device of claim 2, wherein the first data is data associated with at least one of a firmware, a page table, or a parameter of a trained machine learning model.

4. The processing device of claim 2, the security core is further configured to:

determine a third encryption key managed by the encryption key manager to be a new encryption key for the first data and generating, by using the one-way encryption algorithm, a fifth output value based on the first data and the third encryption key; and store the fifth output value in the main memory in association with the first data.

5. The processing device of claim 2, wherein, the second encryption key is identical to the first encryption key, and the third output value is identical to each of the first output value and the second output value.

6. The processing device of claim 2, wherein, the second encryption key is different from the first encryption key, the third output value is different from each of the first output value and the second output value, and the security core is further configured to determine the second encryption key to be a new encryption key for the first data and generate, by using the one-way encryption algorithm, the third output value for the first data based on the first data and the second encryption key.

7. The processing device of claim 2, the security core is further configured to transmit the first encryption key to the host device through a separate channel prior to the obtaining the first data and the first output value.

8. The processing device of claim 2, the security core is further configured to stop, based on determining that the first data stored in the main memory has been tampered with, an operation of a main core that loads and drives or processes data stored in the main memory.

9. The processing device of claim 8, the security core is further configured to store an area associated with the first data in the main memory as a pre-specified value.

10. The processing device of claim 8, the security core is further configured to copy data of an area of the main memory other than an area associated with the first data to a pre-specified area of a separate memory accessible by the security core.

11. The processing device of claim 8, the security core is further configured to determine possible tampering of recovery data based on recovery data stored in a non-volatile memory accessible by the security core and an output value stored in association with the recovery data.

12. The processing device of claim 11, the security core is further configured to notify, based on determining that the recovery data has been tampered with, a host of a failure of recovery and wait to receive a command from the host.

13. The processing device of claim 12, the security core is further configured to perform, based on detecting access from the host while waiting to receive a command from the host, authentication on the host by using an encryption key associated with the host.

14. The processing device of claim 11, the security core is further configured to:

store, based on determining that the recovery data has not been tampered with, the recovery data in the main memory, and resume the operation of the main core.

15. The processing device of claim 14, the security core is further configured to store the recovery data in an area of the main memory different from an area associated with the first data.

16. The processing device of claim 14, the security core is further configured to:

after the resuming the operation of the main core, re-stop, based on detecting tampering of at least some of the data stored in the main memory, the operation of the main core, and notify the host of a failure of recovery and wait to receive a command from the host.

17. The processing device of claim 16, the security core is further configured to perform, based on detecting access from the host while waiting to receive a command from the host, authentication on the host by using an encryption key associated with the host.

18. The processing device of claim 2, wherein the encryption key manager is accessible only by the security core.

\* \* \* \* \*